United States Patent

Hoekman et al.

[11] Patent Number: 5,210,522
[45] Date of Patent: May 11, 1993

[54] EARLY WARNING BRAKE LIGHT ACTUATED BY THE ACCELERATOR PEDAL

[76] Inventors: Robert J. Hoekman, 10485 Courtenay La., Truckee, Calif. 96101; Doneil J. Hoekman, P.O. Box 1803, Gilroy, Calif. 95021

[21] Appl. No.: 773,223

[22] Filed: Oct. 9, 1991

[51] Int. Cl.$^5$ .................................................. B60Q 1/50
[52] U.S. Cl. ..................................... 340/467; 340/479; 307/10.8; 200/61.89
[58] Field of Search ............... 340/463, 464, 466, 467, 340/479, 458, 641, 642; 307/10.8; 200/61.47, 61.89

[56] References Cited

U.S. PATENT DOCUMENTS

| | | | |
|---|---|---|---|
| 2,662,132 | 4/1952 | Crowe et al. | 340/467 X |
| 3,593,278 | 7/1971 | Bower et al. | 340/467 |
| 4,901,055 | 2/1990 | Rosenberg et al. | 340/479 X |

Primary Examiner—Jin F. Ng
Assistant Examiner—Jeffery A. Hofsass
Attorney, Agent, or Firm—Larry D. Johnson

[57] ABSTRACT

An early warning brake light system provides an accelerator pedal-mounted sensor and simple circuitry connected to a vehicle's existing brake light switch circuit. During a panic stop the sensor attached to the accelerator pedal activates the early warning circuitry and immediately delivers current to illuminate the rear brake lights, even before the brake pedal has been depressed, giving trailing vehicles an advance warning that the lead vehicle will be braking.

4 Claims, 2 Drawing Sheets

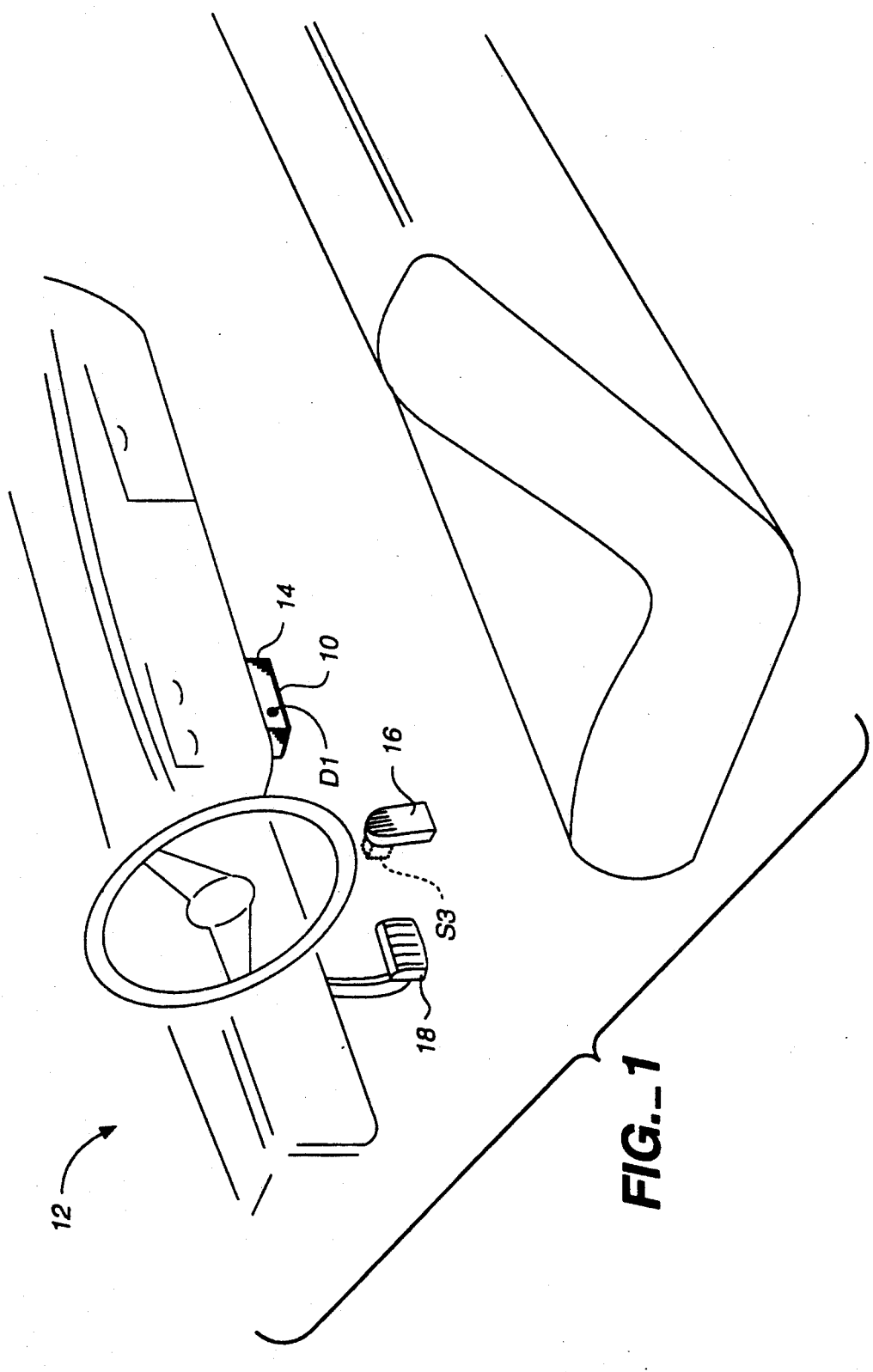
FIG._1

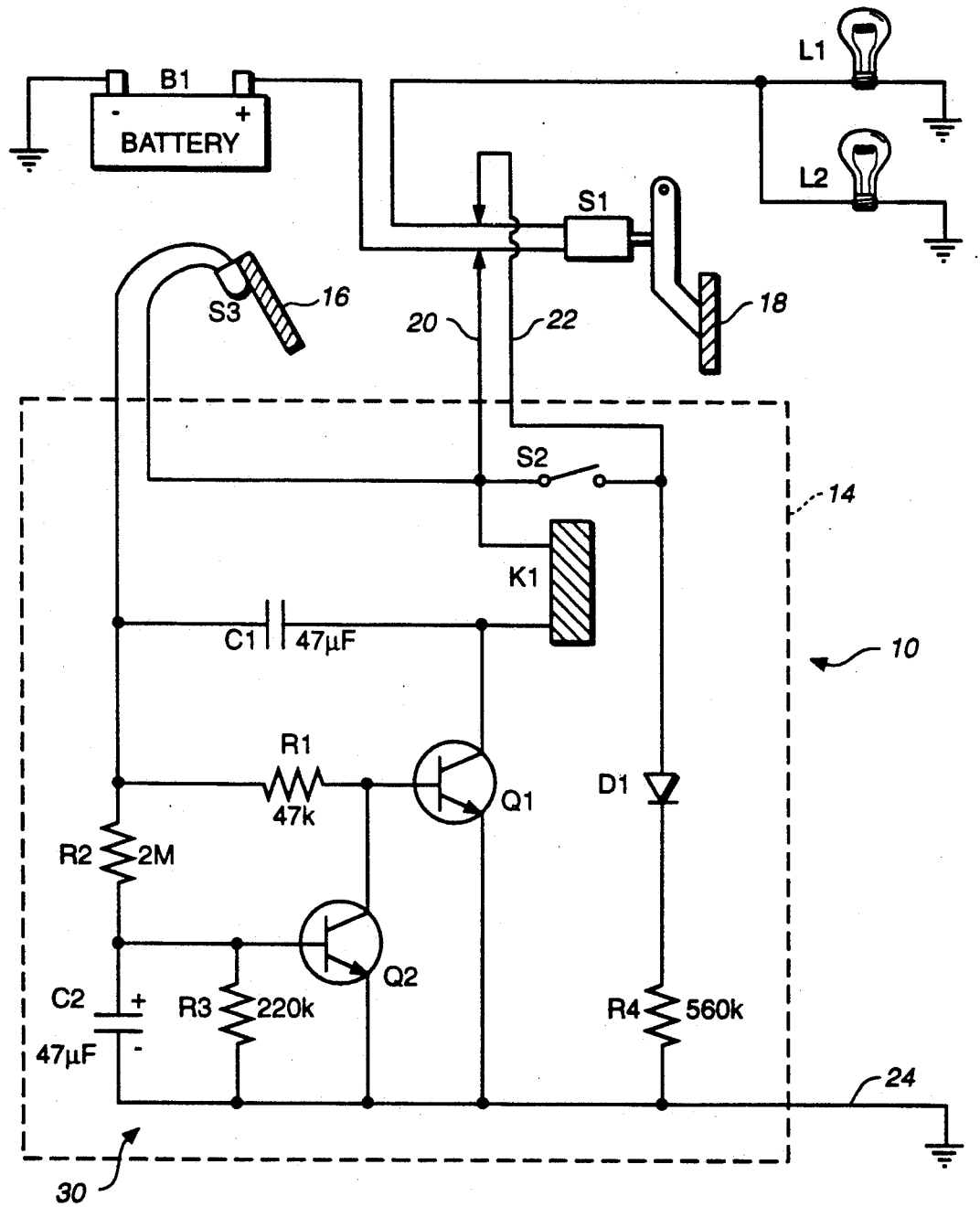
FIG._2

EARLY WARNING BRAKE LIGHT ACTUATED BY THE ACCELERATOR PEDAL

BACKGROUND OF THE INVENTION

1. Field of the Invention

This invention relates generally to automobiles and other vehicles, and more specifically to an improved early warning brake light system for such vehicles.

2. Description of the Prior Art

In a typical automobile or other vehicle, the vehicle's rear brake lights are activated in the following manner and sequence:

1. the driver removes his foot from the accelerator pedal;
2. the driver moves his foot over to and presses down on the brake pedal;
3. the brake light switch is activated (closed); and
4. current flows from the vehicle's battery through the brake light switch circuit to illuminate the rear brake lights.

However, there is an inherent time delay between steps 1 and 2, while the driver is physically moving his foot off of the accelerator pedal, over to the brake pedal, and down on the brake pedal to close the brake light switch. This delay can be significant in that since the brake lights are not illuminated until the end of the sequence, vehicles that may be travelling behind the stopping vehicle are not immediately alerted to stop. In the event of a panic stop by the lead vehicle, this delay means that the drivers of the trailing vehicles may not be able to react quickly enough to avoid a collision.

SUMMARY OF THE INVENTION

The early warning brake light system of this invention provides an accelerator pedal-mounted sensor and simple circuitry connected to a vehicle's existing brake light switch circuit. Using the inventive system, the following takes place when a panic stop is made:

1. the driver quickly removes his foot from the accelerator pedal; and
2. the sensor (e.g., a mercury switch) attached to the accelerator pedal activates the early warning circuitry and immediately delivers current to illuminate the rear brake lights, slightly before they would normally be illuminated, giving trailing vehicles an advance warning that the lead vehicle will be braking.

BRIEF DESCRIPTION OF THE DRAWINGS

FIG. 1 is a pictorial perspective view of an early warning brake light system of this invention as installed in a typical vehicle's occupant compartment, illustrating a possible installation location of the system housing proximate the vehicle's accelerator pedal and brake pedal; and FIG. 2 is a schematic view of the early warning brake light system circuit and operation, illustrating the system's mechanical connection to the vehicle's accelerator pedal and electrical connection to the vehicle's brake light switch circuit.

DETAILED DESCRIPTION OF A PREFERRED EMBODIMENT

FIG. 1 is a pictorial perspective view of an early warning brake light system 10 of this invention as installed in a typical vehicle's occupant compartment 12, illustrating a possible installation location of the system housing 14 proximate the vehicle's accelerator pedal 16 and brake pedal 18. Mercury switch S3 (illustrated in phantom) is physically attached to the back of the accelerator pedal 16, so as not to interfere with the use of the accelerator pedal, but so that it is moved in conjunction with the accelerator pedal when the driver quickly removes his foot for braking. The only (desirably) visible component of the system is a light emitting diode D1 (described infra), here located on the front of the housing 14 so that it can be seen by the driver of the vehicle when underway.

FIG. 2 is a schematic view of the early warning brake light system 10 circuit and operation, illustrating the system's mechanical connection to the vehicle's accelerator pedal 16 and electrical connection to the vehicle's existing brake light switch S1.

The system electronics are housed in the small housing enclosure 14 which may be located anywhere, e.g., under the dashboard of the vehicle (FIG. 1). The mercury switch S3 is mounted on the rear of the accelerator pedal 16 by screws, clamps, adhesive, or any other appropriate fastening method. Circuit wires 20, 22 are connected in parallel with the brake light switch S1. Ground wire 24 is connected to the chassis ground of the vehicle.

The circuit is activated when the accelerator pedal 16 is quickly released, causing the mercury switch S3 to momentarily close (proper design and/or orientation of the mercury switch is necessary to eliminate inadvertent switch closure). When this happens, current flows through the mercury switch S3, a resistor R1, and turns a transistor Q1 on. With transistor Q1 on, a relay K1 will activate, causing the contacts on a switch S2 to close, thereby allowing current to pass from the vehicle's battery B1 and through the switch S2 to illuminate brake lights L1 and L2.

During this brief closure of the mercury switch S3, a capacitor C1 will charge up. When the mercury switch S3 subsequently opens up, the capacitor C1 will discharge and continue to keep the transistor Q1 on, until the current through the capacitor C1 drops low enough to cause the relay K1 to deactivate and the switch S2 to open, thereby ceasing delivery of current to the brake lights (via this early warning circuit). In most installations, and with the preferred component values, the early warning circuitry will keep the brake lights on for about one second of time. During this period of time the driver will normally have activated the vehicle's existing brake light circuitry by depressing the brake pedal 18 and closing the brake light switch S1 in the traditional manner.

The light emitting diode D1, connected to ground via a resistor R4, will also illuminate to indicate whenever the brake lights are illuminated, whether from the early warning system, or from the normal brake light switch circuitry. Thus, the driver is alerted to the operation of both the early warning and normal brake light systems.

A protection circuit 30 for the early warning system is provided by a resistor R2, a resistor R3, a capacitor C2 and a transistor Q2, which guards against prolonged activation of the brake lights should the mercury switch S3 become defective or dislodged from the accelerator pedal. In such a case, current will continually flow through the mercury switch S3 and turn the transistor Q1 on, thereby activating the relay K1, switch S2, and the brake lights L1 and L2. However, after only a few seconds, the capacitor C2 will charge up through the resistor R2. When this happens, the transistor Q2 will turn on and disable the transistor Q1, thereby deactivating the relay K1 and opening the switch S2, and preventing the early warning circuitry from continuing to keep the brake lights illuminated.

Appropriate values for the aforementioned circuit components are as follows:

K1—12 Volt 5 Amp SPST Relay
Q1—2N2222A NPN Silicon Transistor
Q2—2N2222A NPN Silicon Transistor
C1—4.7 uf 25 Volt Non-polarized Capacitor
C2—47 uf 10 Volt Capacitor
R1—47 kohm Resistor
R2—2 megohm Resistor
R3—220 kohm Resistor
R4—560 kohm Resistor While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An early warning brake light circuit for a vehicle having an accelerator pedal, and a brake light switch circuit for selectively illuminating a brake light, said early warning brake light circuit comprising:

a sensor switch mechanically attached to said vehicle accelerator pedal, said sensor switch conditioned to temporarily close when said accelerator pedal is quickly released;

early warning circuit means including relay means electrically connected to said sensor switch and across said brake light switch circuit, wherein when said accelerator pedal is quickly released, said sensor switch temporarily closes and activates said relay means to close said brake light switch circuit to illuminate said brake light, and further including capacitance means electrically connected to said sensor switch and said relay means to continue to activate said relay means and close said brake light switch circuit to illuminate said brake light for a first duration of time after said sensor switch has reopened; and protection circuit means for deactivating said relay means after a second duration of time after said sensor switch has closed.

2. The early warning brake light circuit of claim 1 wherein said sensor witch comprises a mercury switch.

3. The early warning brake light circuit of claim 1 further including an indicator of brake light illumination.

4. The early warning brake light circuit of claim 3 wherein said indicator comprises a light emitting diode electrically connected to said early warning circuit means.

* * * * *